(No Model.)
A. W. WILSON.
ROPE GRIP.
No. 556,485. Patented Mar. 17, 1896.
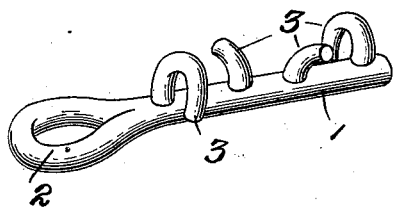
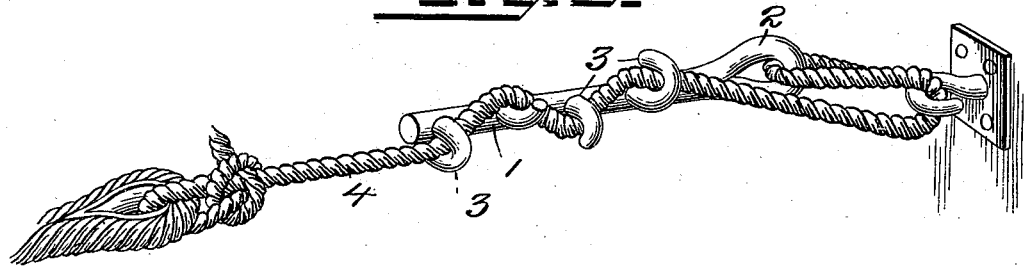
Witnesses
H. J. Koerth
R. M. Smith
Inventor
Albert W. Wilson.
By his Attorneys,
C. A. Snow & Co.

UNITED STATES PATENT OFFICE.

ALBERT W. WILSON, OF GENESEO, ILLINOIS.

ROPE-GRIP.

SPECIFICATION forming part of Letters Patent No. 556,485, dated March 17, 1896.

Application filed August 19, 1895. Serial No. 559,829. (No model.)

*To all whom it may concern:*

Be it known that I, ALBERT W. WILSON, a citizen of the United States, residing at Geneseo, in the county of Henry and State of Illinois, have invented a new and useful Rope-Grip, of which the following is a specification.

This invention relates to an improvement for adjusting the length of and securing and holding the guy-ropes of hammocks or tents or other articles or structures, and has for its object to provide a simple and efficient device of small compass which may be readily secured to a rope at any point, or removed therefrom with equal facility, and which will effectually prevent all liability of the slipping of the rope at the point where it is engaged by said gripping device.

To this end the invention consists in an improved rope-grip embodying certain novel features and details of construction, as hereinafter fully described, illustrated in the drawings, and finally pointed out in the claim.

In the accompanying drawings, Figure 1 is a perspective view of the improved rope-gripping device. Fig. 2 is also a perspective view illustrating the manner in which the device is applied in practical use.

Similar numerals of reference designate corresponding parts in both the figures of the drawings.

Referring to the accompanying drawings, 1 designates the main body of the device, which is made of metal and of any desired length, according to the conditions hereinafter named, and either round, flat or polygonal in cross-section, as will be found most expedient in manufacture. At one end of the main body or shank 1 an eye 2 is formed integrally therewith, and this eye is intended to receive the end of the guy or other rope in the manner shown in Fig. 2. Disposed lengthwise of the main body or shank 1 is a series of curved prongs or extensions 3, which are each and all connected with such main body or shank upon the same side thereof, as shown in Fig. 1, and arranged also to project alternately in opposite directions. The front and rear or outside prongs or extensions are U-shaped or slightly greater than a semicircle, while the intermediate prongs are of shorter extent or substantially in the form of quadrants. In the drawings four of such prongs or extensions are shown, two of the semicircular or U-shaped form and two of the quadrantal form; but it will be apparent that the number of prongs or extensions may be increased or diminished, according to the size and nature of the rope and the amount of strain to which the rope is to be subjected.

In operation, the rope, indicated at 4, is passed around the tree or other object or through a hook or eye secured thereto, and the gripping device described, which is attached to the end of the rope, is brought into proximal relation with the main body of the rope and the latter slackened sufficiently to enable a portion thereof to be reeved through and alternately upon opposite sides of the several prongs or extensions 3 in the manner illustrated in Fig. 2, whereupon, by reason of the reverse deflections in the rope caused by the peculiar disposition of said prongs or extensions, the gripping device and the rope engaged thereby will be prevented from relative slipping.

While the device is particularly convenient in the adjustment of hammocks and tents, it will be apparent that it may be utilized in a variety of ways and in a number of places.

It will be apparent that the object in making the end or outside prongs of greater length and giving them the U shape shown and described is to more effectively prevent the liability of the opposite ends of the gripping device becoming disengaged from the rope.

The device may be made from any metal which will afford the necessary strength and may be made of any size or with any number of prongs or extensions, and other changes in the form, proportion and minor details of construction may be resorted to without departing from the spirit or sacrificing any of the advantages of this invention.

Having thus described the invention, what is claimed as new, and desired to be secured by Letters Patent, is—

The herein-described rope-grip, comprising a straight shank having an eye at one end, U-shaped prongs located one at or near each end of the shank, and one or more intermediate short prongs, all of said prongs being disposed upon and projecting from the same side of the shank and having their points of juncture with the body or shank in longitudinal alignment, the said prongs being arranged to project alternately in reverse directions, substantially as and for the purpose specified.

In testimony that I claim the foregoing as my own I have hereto affixed my signature in the presence of two witnesses.

ALBERT W. WILSON.

Witnesses:
F. B. WELLS,
W. J. McBROOM.